J. R. FLEMING.
CAR AXLE BOX.
APPLICATION FILED MAY 25, 1918.

1,296,940.

Patented Mar. 11, 1919.

WITNESSES
Frederick Diehl.

INVENTOR
J. R. Fleming.
BY
ATTORNEYS

UNITED STATES PATENT OFFICE.

JAMES R. FLEMING, OF SCRANTON, PENNSYLVANIA.

CAR-AXLE BOX.

1,296,940.

Specification of Letters Patent.   Patented Mar. 11, 1919.

Application filed May 25, 1918.   Serial No. 236,541.

*To all whom it may concern:*

Be it known that I, JAMES R. FLEMING, a citizen of the United States, and a resident of Scranton, in the county of Lackawanna and State of Pennsylvania, have invented a new and Improved Car-Axle Box, of which the following is a full, clear, and exact description.

Among the principal objects which the present invention has in view are: to provide means for lubricating the moving parts of a roller bearing; to provide a lubricating system for sealed bearings; and to strengthen the bearing construction and lighten the material forming the same.

Drawings.

Figure 1:
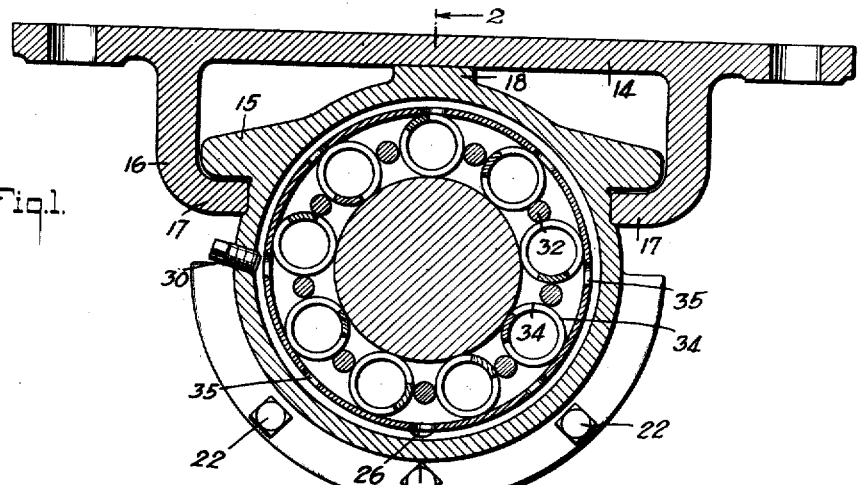
Figure 1 is a cross section of a journal box and journal bearing contained therein, said box being constructed and arranged in accordance with the present invention.

Description.

As seen in the accompanying drawings, the bearing box 8 has an integrally formed end wall 9. A groove is formed in said wall to receive the dust gasket 10, through which is passed in bearing relation thereto, the axle journal 11. A wearing plate 12 is attached in any suitable manner to the end surface of the wall 9 to take the service wear of the hub 13 of the carrying wheel which is mounted on the journal 11.

The bearing herein disclosed is especially designed for employment in mining car service and is held in bearing relation to the bolster plate 14, by laterally extended lugs 15 and brackets 16, the ends 17 whereof are extended under the lugs 15, as seen best in Fig. 1 of the drawings. The ends 17 and lugs 15 coöperate to prevent the box 8 rotating or rocking on the bearing pad 18 with which the box is provided at the apex thereof.

Figure 2:
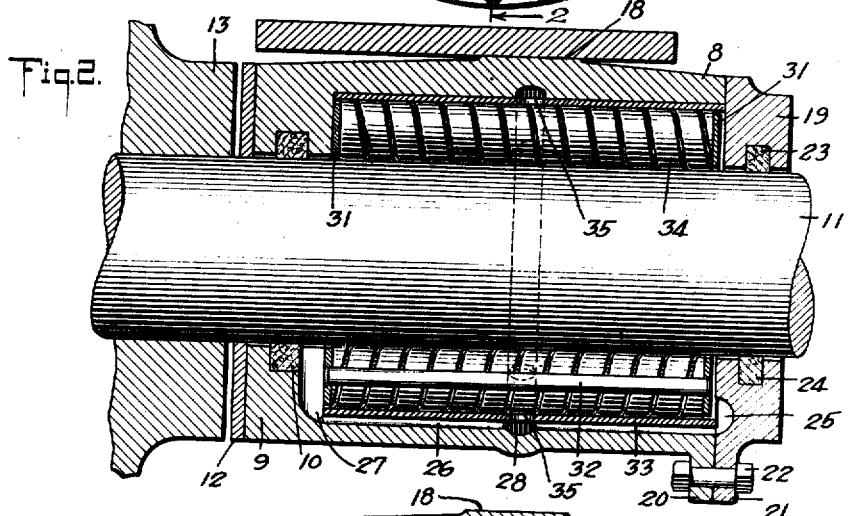
Fig. 2 is a longitudinal section of the same, the section being taken as on the line 2—2 of Fig. 1.
Figure 3:
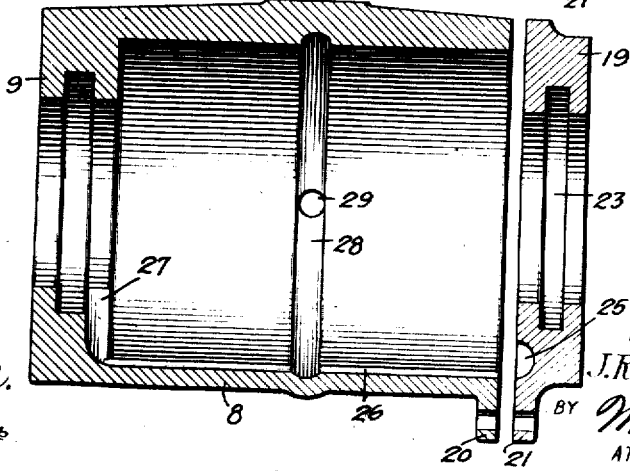
Fig. 3 is a vertical section of the bearing casing and end cover therefor, the section being taken as on the line 2—2 of Fig. 1.

As shown in Figs. 1 and 2, the material of the box 8, both longitudinally and transversely, falls away from the pad 18 so as to form a limited wearing surface and one which readily accommodates itself to the movement of the car and journal box. The front end of the box 8 is closed by a cover plate 19, a semi-circular bolting flange 20 being provided on the box at the lower edge thereof to receive a bolting flange 21 and bolts 22, which are extended through both flanges to hold the cover plate 19 in service relation to the said box. The cover plate 19 has a groove 23, to receive a dust gasket 24, as seen best in Fig. 2 of the drawings. The cover plate 19 is also provided with a collecting groove 25, wherein lubricant is collected and distributed to a groove 26 extending lengthwise of the box for establishing communication between the groove 25, a corresponding collection groove 27, and a distributing annular groove 28. These grooves are best seen in Fig. 3 of the drawings, wherein also is shown the supply opening 29, by which the lubricant is forced into the bearing and into the groove 28 referred to. The opening 29 is closed in service by a screw plug 30, shown best in Fig. 1 of the drawings.

The bearing box 8 is bored to receive a suitable roller bearing, that known as the "Hyatt roller bearing" being shown in the drawings. The rollers are held in position by the cage having circular plates 31, which are united by tie-rods 32. The cage is encompassed by a bearing casing 33. The casing 33 encompasses the cage including the bearing rollers 34, and is provided at suitable intervals with perforations 35, centrally located and in line to register with the groove 28. The perforations 35 are provided to permit the free access of the lubricant held in the box, to the rollers 34 and parts connected therewith within the casing 33. In service, a suitable lubricant is supplied to the bearings through the opening 29, the plug 30 being removed. It is desirable that the box 8 be filled to about the median level therein.

By means of the grooves 26 and 28, the lubricant is distributed and applied to the exterior of the casing 33 and to the interior of said casing for distribution to the outer surfaces of the rollers 34. The lubricant is conveyed by the action of the spiral rollers toward the ends of the cage and is crowded past the circular plates 31 thereof for collection in the grooves 25 and 27. From thence, the lubricant flows by way of the groove 26, to the groove 28, to be again distributed to the rollers 34 and to the interior of the cage thereof, through the perforations 35 in the bearing casing 33. In this manner, a perfect circulation of the lubricant is maintained.

Claims.

1. An article as characterized comprising a cylindrical box member having a contracted and an enlarged opening at opposite ends thereof, said member having annular grooves, one disposed in the contracted opening and the other intermediate the ends of said member; a cover for the enlarged opening of said member, said cover having a lubricant-collecting groove at the inner face thereof, said groove being concentric with said opening; means communicating between said collecting groove and said groove intermediate the ends of said member; a cylindrical casing fitting the interior of said box member; a friction-reducing bearing mounted within said casing and having rolling members in contact with said casing; and means for distributing lubricant to said rolling members through said casing intermediate the ends thereof.

2. An article as characterized comprising a cylindrical box member having a contracted and an enlarged opening at opposite ends thereof, said member having annular grooves, one disposed in the contracted opening and the other intermediate the ends of said member, said member being further provided adjacent the contracted end opening with a lubricant-collecting groove; a cover for the enlarged opening of said member, said cover having a lubricant-collecting groove at the inner face thereof, said groove being concentric with said opening; means for communicating between said lubricant-collecting grooves and said annular groove intermediate the ends of said box member for promoting circulation of lubricant therein; a cylindrical casing fitting the interior of said box member; a friction-reducing bearing mounted within said casing and having rolling members in contact with said casing; and means for distributing lubricant to said rolling members through said casing intermediate the ends thereof.

3. An article as characterized comprising a cylindrical box member having a contracted and an enlarged opening at opposite ends thereof, said member having annular grooves, one disposed in the contracted opening and the other intermediate the ends of said member; a cover for the enlarged opening of said member, said cover having a lubricant-collecting groove at the inner face thereof, said groove being concentric with said opening; means for permanently installing said cover in service relation to said box member for sealing said box member; means communicating between said collecting grooves and said groove intermediate the ends of said member; a cylindrical casing fitting the interior of said box member; a friction-reducing bearing mounted within said casing and having rolling members in contact with said casing; and means for distributing lubricant to said rolling members through said casing intermediate the ends thereof.

4. An article as characterized comprising a cylindrical box member having a contracted and an enlarged opening at opposite ends thereof, said member having annular grooves, one disposed in the contracted opening and the other intermediate the ends of said member; a cover for the enlarged opening of said member, said cover having a lubricant-collecting groove at the inner face thereof, said groove being concentric with said opening; means for permanently installing said cover in service relation to said box member for sealing said box member, said means embodying semi-circular bolting flanges, one integral with said box member at the outer end thereof and the other integral with said cover, and fastening members extending through for clamping together said flanges; means communicating between said collecting grooves and said groove intermediate the ends of said member; a cylindrical casing fitting the interior of said box member; a friction-reducing bearing mounted within said casing and having rolling members in contact with said casing; and means for distributing lubricant to said rolling members through said casing intermediate the ends thereof.

5. An article as characterized comprising a permanently closed cylindrical journal box member; a friction-reducing bearing having rolling members; a bearing casing for said members; and a lubricating system for said bearing embodying a plurality of collecting grooves disposed at the opposite ends of said bearing and in communication with said casing, and a distributing groove formed in said box member communicating between said collecting grooves for promoting the circulation of lubricant about said casing exteriorly and interiorly thereof.

JAMES R. FLEMING.